United States Patent [19]

Nishi et al.

[11] Patent Number: 5,739,884
[45] Date of Patent: *Apr. 14, 1998

[54] FERROELECTRIC LCD WITH A PRETILT ANGLE OF 1.6-3.1 DEGREES AND A SURFACE TENSION OF 11-15 DYNE/CM

[75] Inventors: Takeshi Nishi; Toshimitsu Konuma, both of Kanagawa, Japan

[73] Assignee: Semiconductor Energy Laboratory Co., Ltd., Kanagawa-ken, Japan

[*] Notice: The term of this patent shall not extend beyond the expiration date of Pat. No. 5,495,355.

[21] Appl. No.: 233,952

[22] Filed: Apr. 28, 1994

[30] Foreign Application Priority Data

May 6, 1993 [JP] Japan ................. 5-131307

[51] Int. Cl.⁶ .................. G02F 1/141; G02F 1/13
[52] U.S. Cl. .................. 349/133; 349/134; 349/172
[58] Field of Search .................. 359/75, 100, 104; 349/123, 133, 134, 172, 174

[56] References Cited

U.S. PATENT DOCUMENTS

| | | | |
|---|---|---|---|
| 4,939,003 | 7/1990 | Aoki et al. | 359/75 |
| 5,153,755 | 10/1992 | Higa | 359/75 |
| 5,200,848 | 4/1993 | Hanyu et al. | 359/100 |
| 5,328,714 | 7/1994 | Nakajima et al. | 427/58 |
| 5,400,159 | 3/1995 | Takao et al. | 359/75 |
| 5,426,525 | 6/1995 | Hanyu et al. | 359/78 |
| 5,495,355 | 2/1996 | Konuma | 359/78 |

FOREIGN PATENT DOCUMENTS 6-18887  1/1994  Japan.

OTHER PUBLICATIONS

"Development of Ferroelectric Liquid Crystal Display Capable of Displaying Moving Image", Apr. 28, 1992, Messrs. Toshimitsu Konuma and Shunpei Yamazaki, pp. 52-61.

*Primary Examiner*—William L. Sikes
*Assistant Examiner*—Toan Ton
*Attorney, Agent, or Firm*—Sixbey Freidman Leedom & Ferguson; Gerald J. Ferguson, Jr.; Evan R. Smith

[57] ABSTRACT

A liquid crystal display device is characterized by comprising first and second substrates on a surface of which electrodes are formed, a liquid crystal material with ferroelectricity or antiferroelectricity interposed between the first and second electrodes, and an orientation film and disposed between the electrode or electrodes formed on the surface of said first and/or second substrate whose surface has been subjected to a process which gives optically uniaxial orientation to the liquid crystal material, wherein said orientation film has a pretilt angle of 1.6 to 3.1 degree with respect to a nematic liquid crystal. Further, a value of a polar term of surface tension on the surface of the orientation film ranges from 11 to 15 dyne/cm.

14 Claims, 12 Drawing Sheets

FERROELECTRIC LCD WITH A PRETILT ANGLE OF 1.6-3.1 DEGREES AND A SURFACE TENSION OF 11-15 DYNE/CM

BACKGROUND OF THE INVENTION

1. Field of the Invention

The present invention relates to a liquid crystal display device using a liquid crystal material having ferroelectricity or antiferroelectricity superior in a high-speed response.

2. Prior Art

The liquid crystal display device performs display by applying an electric field to the crystal material from the exterior so that the optical anisotropy of the material is changed to thereby convert an electric signal into a light signal.

FIG. 1 shows a structure of a general liquid crystal display device. The liquid crystal display device includes electrodes 103 and 104 formed on substrates 101 and 102 for driving a liquid crystal material. The electrodes 103 and 104 are disposed in such a manner that the respective electrodes 103 and 104 on the substrates 101 and 102 face each other. A liquid crystal material 105 is interposed between the substrates 101 and 102. The liquid crystal devices which utilize birefringence of the liquid crystal material have been widely known. In order to effectively utilize the birefringence of the liquid crystal material, one side of the respective substrates which is brought in contact with the liquid crystal material 105 is subjected to some orienting process 106 so that an optical axis of the liquid crystal material 105 is oriented in an intended direction.

Among the above-mentioned liquid crystal display devices, ones using the liquid crystal material having ferroelectricity or antiferroelectricity provide such an excellent characteristic that a response speed is approximately 1,000 times as high as that of the TN type or STN type liquid crystal display device.

As described above, in the liquid crystal device using the liquid crystal material having the ferroelectricity or antiferroelectricity, the surfaces of two substrates, which interpose the liquid crystal material therebetween and is to be in contact with the liquid crystal material are subjected to orienting process, and in the case of using the liquid crystal material, an uniaxial orientation is given to the liquid crystal material. As the orienting processes, there have been known a method of obliquely depositing $SiO_2$ on two substrates interposing a liquid crystal material therebetween, a rubbing method of forming dielectric thin films on the surfaces of two substrates at the side of electrodes formed thereon as oriented films and of rubbing the surfaces of the dielectric films, and a method of applying an electric field or a magnetic field to a liquid crystal material from the exterior. Among these orienting processes, the rubbing method is superior in view of industry.

In the rubbing method, in general, an orientation film of 100 to 1000 Å is formed on at least one side of two substrates of the liquid crystal display device, which is in contact with the liquid crystal material, and the surface of the orientation film is subjected to the rubbing process, that is, the surface of the film is rubbed with cloth made of cotton, nylon or the like. The orientation films are made of organic component such as polyvinyl alcohol, nylon, polyimide or the like, or inorganic component such as silicon oxide.

When the liquid crystal has been optically uniaxially oriented by the rubbing process, the molecules of the liquid crystal are not arranged in parallel with the substrates interposing the liquid crystal therebetween, but is obliquely oriented with a certain oblique angle. In general, this angle is called a pretilt angle. Conventionally, there has been considered that it is good to set the pretilt angle to 5° or more in view of various points.

However, the liquid crystal using the liquid crystal material with ferroelectricity or antiferroelectricity has the following problems.

When the liquid crystal display device manufactured by orienting the liquid crystal material with ferroelectricity or antiferroelectricity is actuated by means of a square wave, there may occur a portion within a pixel where a light is leaked while displaying the dark state. Such a light leakage causes the contrast of the liquid crystal display device to be lowered.

In the liquid crystal display device of this type, in the case where the orientation state of the liquid crystal material is observed under the crossed Nicol through a polarization microscope, it is recognized that while the greater parts of the liquid crystal material are optically uniaxially oriented, however, defects in a line state or zigzag state occur partly.

Further, if the display mode is switched between the dark state and the bright state, it takes much time to obtain a given quantity of transmitted light after changing between the dark state and the bright state. Also, if any state is maintained as it is, there is a case where the quantity of transmitted light is changed. For example, there has been found such a phenomenon that the quantity of transmitted light of a pixel is gradually increased in the dark state.

Since the liquid crystal display device like this is unstable in the optical characteristics, it is not suitable for simple matrix drive for driving the display device by means of a pulse waveform and active matrix drive.

FIG. 2 shows a current-to-voltage characteristic of such a liquid crystal display device. Shown in the figure is a case where the liquid crystal material with ferroelectricity is used. The current-to-voltage characteristic has been measured by connecting a resistor of 100 kΩ in serial to the liquid crystal display device, and by measuring a voltage drop of the resistor through an oscilloscope when applying a chopping wave of the 5 Hz frequency and the ±30 V voltage to the element. The current value in the figure represents a value resulting from dividing a voltage read by the oscilloscope by the above-mentioned resistance value. As shown in FIG. 2, the current component is classified into three parts, that is, a component 201 acting as a capacitor disposed between the electrodes of the liquid crystal display device, a current component 202 flowing when the spontaneous polarization of the liquid crystal material is inverted with the direction of the electric field being changed, and the other current component 203. The third current component will be hereinafter represented by a 2nd peak current.

As the second peak current is large, the initial transmissivity is not held and the optical characteristics become unstable. Therefore, the reduction of the 2nd peak current has been required.

SUMMARY OF THE INVENTION

The present invention has been made in view of the above-mentioned problems, and therefore it is an object of the invention to provide a liquid crystal display device with stable optical characteristics.

The above object of the invention has been achieved by provision of a liquid crystal display device, which comprises: first and second substrates on the surface of which electrodes are formed, respectively; a liquid crystal material with ferroelectricity or antiferroelectricity interposed between the first and second electrodes; and an orientation film disposed between the electrodes formed on the first and second substrates and the liquid crystal material and made of a polyimide based resin whose surface has been subjected to a process which gives optically uniaxial orientation to the liquid crystal material, which orientation film is capable of causing a nemaic liquid crystal to have a pretilt angle ranging between 1.6° and 3.1° by contacting thereto.

Further, a liquid crystal display device according to the present invention comprises: first and second substrates on the surface of which electrodes are formed, respectively; a liquid crystal material with ferroelectricity or antiferroelectricity interposed between the first and second electrodes; and an orientation film disposed between the electrodes formed on the surfaces of the first and/or second substrates and the liquid crystal material and made of a polyimide based resin whose surface has been subjected to a process which gives optically uniaxial orientation to the liquid crystal material, in which a value of a polar term of surface tension on the surface of the oriented film ranges from 11 to 15 dyne/cm.

Further, in the above-mentioned structure, at least one of the first and second substrates comprises a substrate with a light transmission property.

Still further, in the above-mentioned structure, the first substrate is provided with a drive switching element thereon at each intersection of signal electrodes and scanning electrodes, and the second substrate is provided with an opposed electrode. The drive switching element comprises a thin film transistor for example.

The inventors have recognized some distinctive characteristic from the results of research.

The inventors manufactured a liquid crystal cell by changing the forming condition of an orientation film made of a polyimide based resin in the liquid crystal display device, measured a current-to-input voltage characteristic and a pretilt angle, and investigated the relationship between the pretilt angle and the second peak current.

The measurement of the pretilt angle has been conducted by the crystal rotation method which is an optical measuring method. Since this method is difficult to measure an optically biaxial material such as a ferroelectric liquid crystal material, an optically uniaxial liquid crystal such as a nematic liquid crystal was used and a measurement value of the pretilt angle of the nematic liquid crystal material in contact with the orientation film was used for measurement of the pretilt angle.

The results are shown in FIG. 3 (film thickness of 200 Å and baking temperature of 250° C.). The liquid crystal cell having a small second peak current tends to hold an initial transmissivity. From the results shown in FIG. 3, as the pretilt angle of the liquid crystal cell is small, the second peak current is more decreased. That is, the initial transmissivity can be held when the pretilt angle is small.

The second peak current tended to be remarkably reduced particularly when the pretilt angle was set to 1.6° to 3.1°. At this time, the value of the polar term of the surface tension on the surface of the oriented film was 11 to 15 dyne/cm. The present invention utilizes this result to provide a liquid crystal display device with high contrast display and with stable optical characteristics.

The liquid crystal display device of the invention has been achieved by properly setting the forming condition of the oriented film and the optically uniaxial orienting process, that is, the rubbing condition.

As the forming condition of the orientation film made of a polyimide based resin, the sintering temperature of 200° C. and the film thickness of 100 to 200 Å were proper.

In particular, when the whole film was not completely changed into imide and was not satisfactorily hardened, the film was considerably rubbed off by the rubbing operation. As a result, the orientation of the liquid crystal material has been dispersed, and therefore the sintering temperature is preferably set to 200° C. or more.

As the rubbing condition, if rubbing is weak, the pretilt angle is increased whereby the orientation is deteriorated. In general, when the rubbing density is high, the strength of rubbing is increased. The relationship between the rubbing density and the pretilt angle is shown in FIG. 4 (the film thickness of 200 Å and the sintering temperature of 250° C.). As can be seen from FIG. 4, there is a tendency that the pretilt angle is decreased as the rubbing density is increased. The rubbing density is a value obtained from the following equation 1.

$$L=N(1+2\pi rn/60v) \qquad \text{[equation 1]}$$

where L is a rubbing density, N is the rubbing number of times, r is a radius of a rubbing roll (mm), n is a rotary speed of the rubbing roll (rpm), and v is a speed of a stage on which substrates are mounted (mm/sec).

For reducing the second peak, it is preferable to set the pretilt angle small, and therefore it is preferable to strengthen the rubbing treatment. However, if rubbing is too strengthened, there may occur a problem that the oriented film is peeled off, and therefore it is preferable to set the rubbing density to 100 to 500. If the pretilt angle is made smaller than 1.6°, the orientation film tends to be peeled off by the rubbing operation, whereas if it is made larger than 3.1°, the orientation defects are increased and the second peak is also increased.

In view of the above-mentioned film forming condition and the rubbing density, the pretilt angle is set to 1.6° to 3.1°. At this time, the value of the polar term of the surface tension on the oriented film is set to 11 to 15 dyne/cm.

In the liquid crystal display device in which a liquid crystal material with ferroelectricity or antiferroelectricity is optically uniaxially oriented, when the liquid crystal material is driven by applying an electric field to the material from the exterior, the spontaneous polarization is inverted by inversion of the electric field so that the direction of the longitudinal axis of the liquid crystal molecule is changed thereby performing the switching operation. After inversion of the electric field, the spontaneous polarization is aligned perpendicular to the substrates. As a result, because polarization occurs on the surface of the liquid crystal material, residual voltage is developed and an electric field occurs in the opposite direction inside of the liquid crystal material. Because of the electric field in the opposite direction, a torque is exerted in such a manner that spontaneous polarization is inverted, as the result of which the direction of the spontaneous polarization 502 of a liquid crystal material 501 is changed and deviate from the direction perpendicular to the substrates, as shown in FIG. 5.

Such a twisted orientation is of two-step response at the time of switching operation since the orientation of the spontaneous polarization which has been oriented at once is further changed. For this reason, when the current-to-input voltage characteristic is measured, two peaks occur.

With the structure of the invention, the above mentioned twisted orientation of the spontaneous polarization of the liquid crystal material is eliminated. Therefore, since the switching process is only of one step, the second peak current is decreased.

Therefore, by selecting appropriate film formation conditions and appropriate rubbing density, it is possible to obtain an optimum orientation control film where the pretilt angle and the surface tenstion of the orientation control film can be made within the foregoing ranges. Further, it is possible to remove an undesirable electric current component, i.e. the second peak current. Accordingly, the optical response can be improved and a stable display with a high contrast can be obtained.

BRIEF DESCRIPTION OF THE DRAWINGS

The accompanying drawings, which are incorporated in and constitute a part of this specification, illustrate embodiments of the invention, and together with the description, serve to explain the objects, advantages and principles of the invention. In the drawings.

DETAILED DESCRIPTION OF THE PREFERRED EMBODIMENTS

Embodiments of the present invention will be described with reference to the accompanying drawings.
(First Embodiment)

In the first embodiment, in order to recognize the effects of the present invention, various characteristics have been evaluated using the liquid crystal cell of one pixel.

Figure 1:
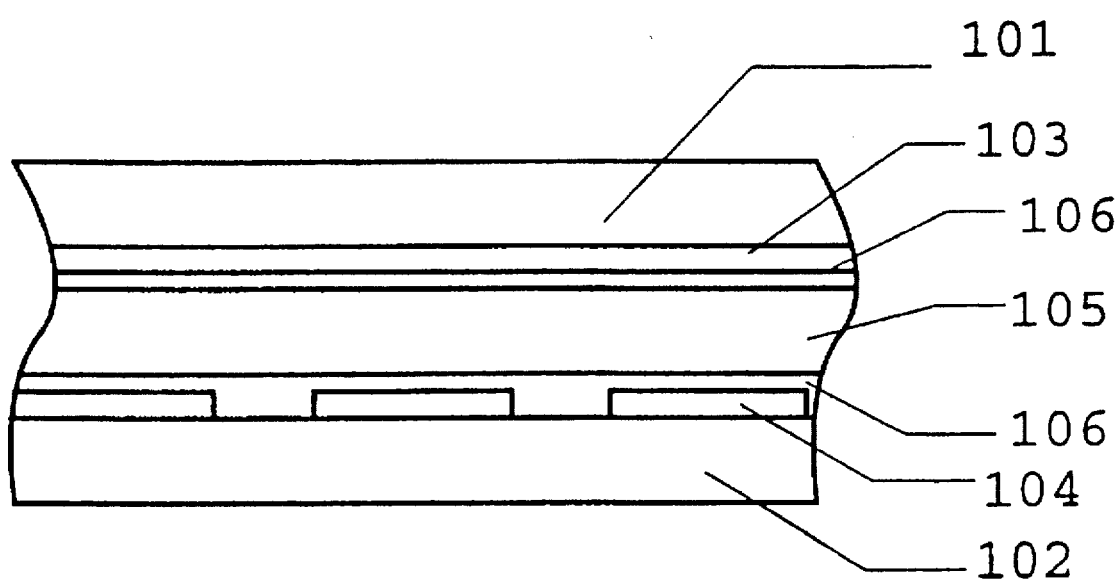
FIG. 1 is a schematic diagram showing a general liquid crystal display device.
Figure 2:
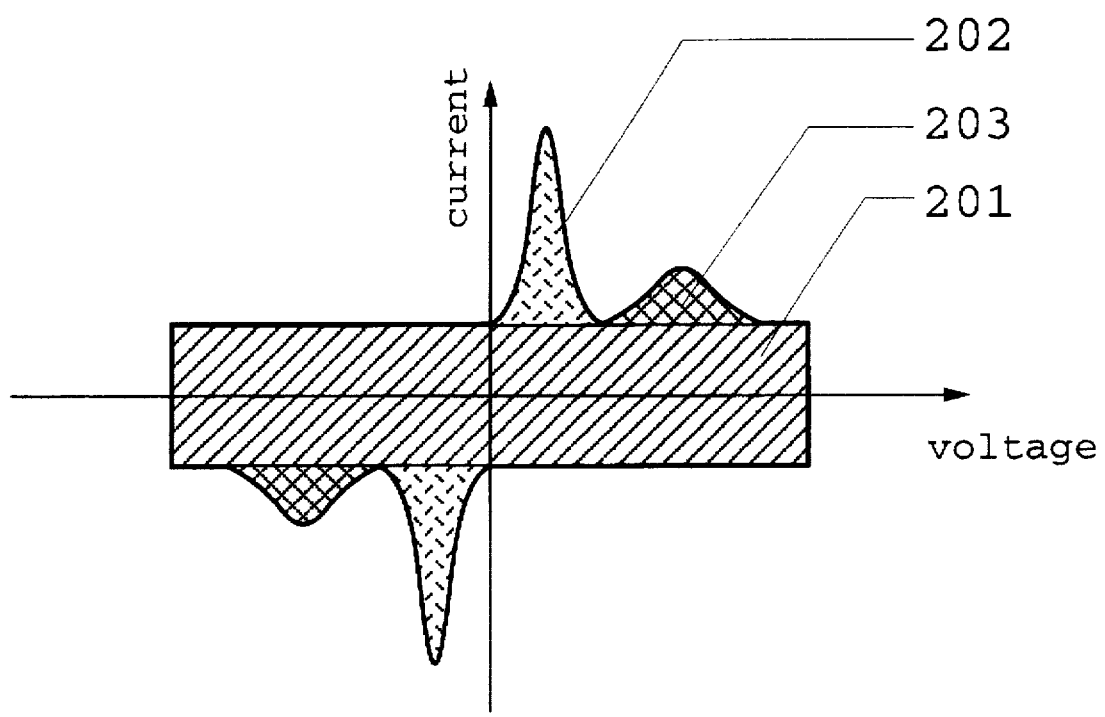
FIG. 2 is a graph showing the current-to-input voltage characteristic in a conventional liquid crystal display device.
Figure 3:
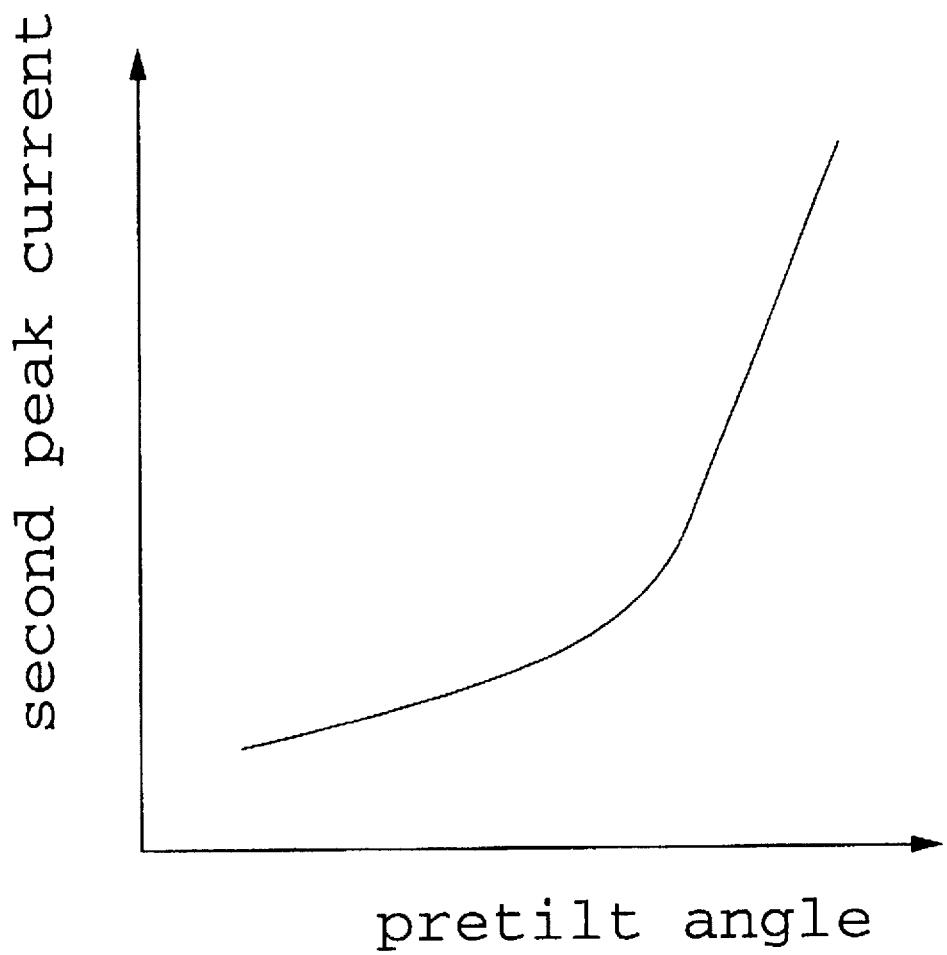
FIG. 3 shows a relationship between a pretilt angle and a second peak in a liquid crystal display device.
Figure 4:
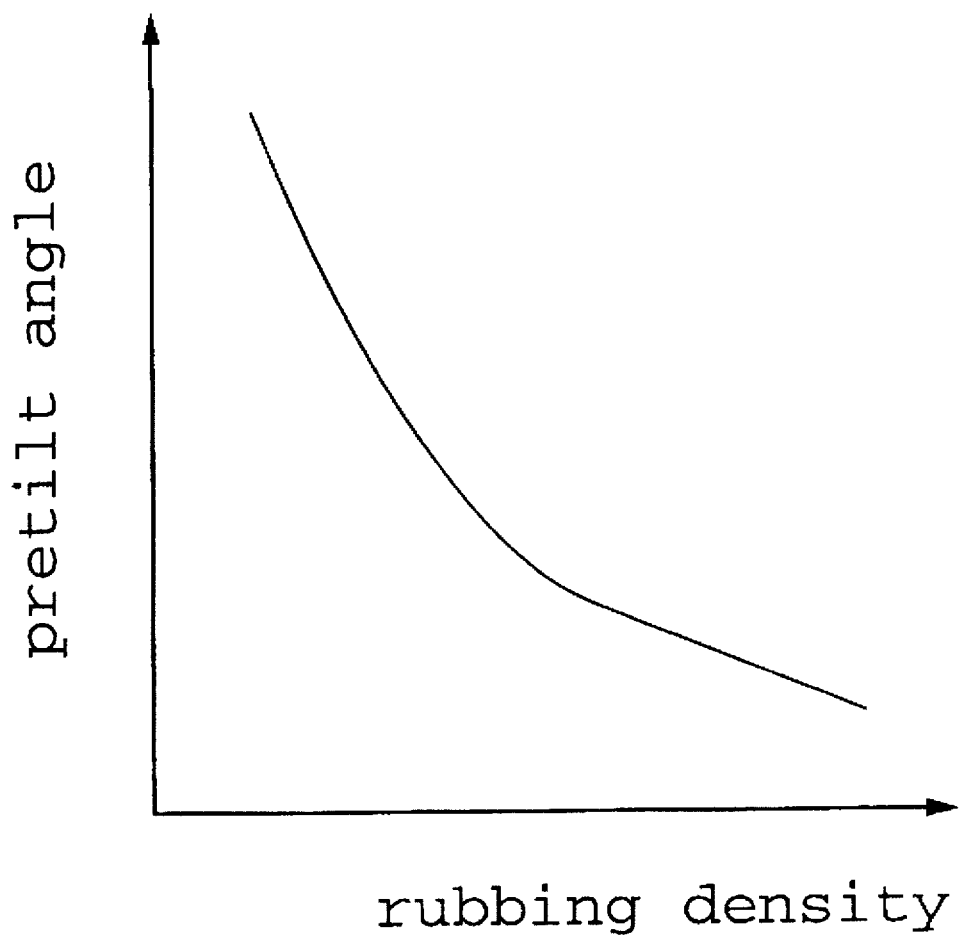
FIG. 4 shows a relationship between a rubbing density and a pretilt angle in a liquid crystal display device.
Figure 5:
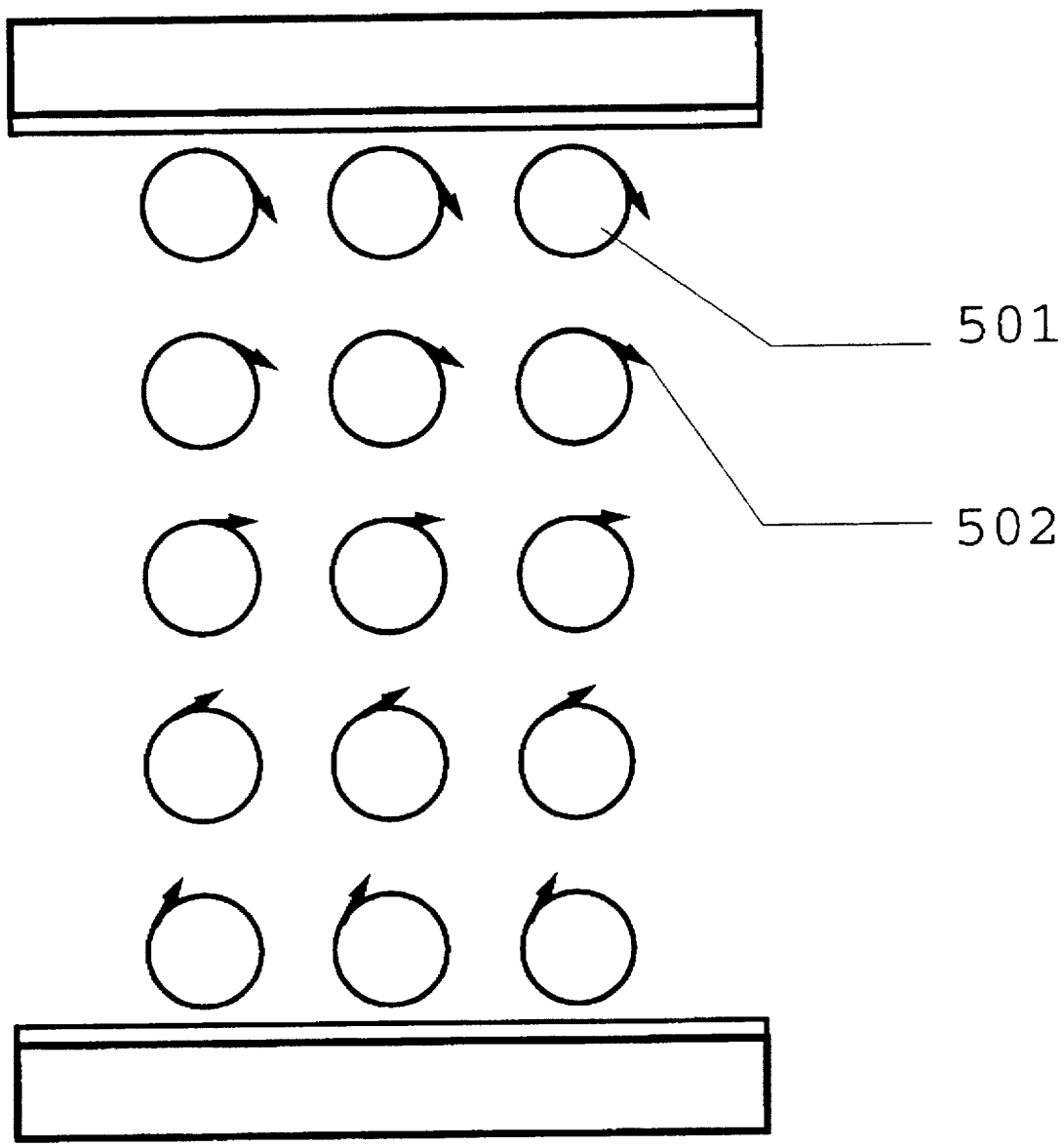
FIG. 5 shows a direction of spontaneous polarization of a liquid crystal material of a conventional liquid crystal display device.
Figure 6:
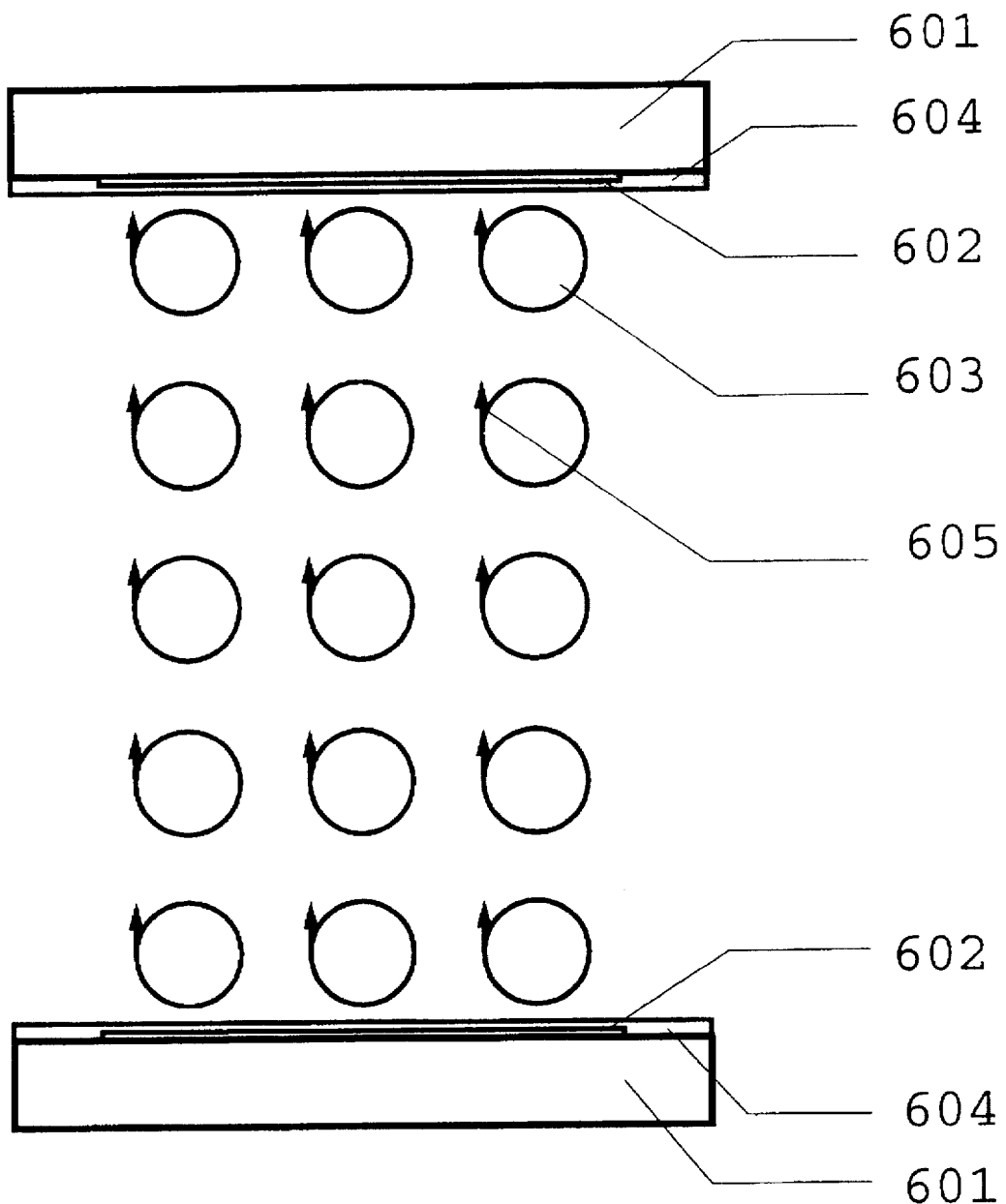
FIG. 6 shows a direction of spontaneous polarization of a liquid crystal cell in a first embodiment of the invention.

First, a cell for evaluation of electro-optic characteristics and the current-to-input voltage characteristic has been prepared. FIG. 6 shows the structure of the liquid crystal cell. The liquid crystal cell includes two substrates 601 on which electrodes 602 are formed, respectively, for driving a liquid crystal material 603 which is interposed between the substrates 601. The two substrates 601 are made of a soda-lime glass plate each having a thickness of 1.1 mm. Transparent electrodes comprising ITO are formed on the respective glass substrates. The size of a pixel is 5 mm².

On the surfaces of the substrates 601 having the electrodes 602 thereon, orientation films 604 were formed, respectively. The oriented films 604 used in this embodiment were made of polyimide based resin RN-305 (made by Nissan Chemical Industries, Ltd.). The oriented films were prepared by diluting a stock solution (solid amount of 6%) by n-methyl -2-pyrolidone. The dilution density was of two way, that is, 16 times and 32 times. The diluted solutions were coated on the two substrates 601 by a spin coat method. The substrates 601 were heated at a high temperature for 2.5 hours so that the solvent was dried and the coated films were sintered and hardened. There were formed 4 kinds of films under the condition where the sintering temperature was at 150, 200, 250 and 300° C., respectively.

Subsequently, the polyimide resins on each of the two substrates were rubbed. The rubbing process was performed by rubbing a roller having a radius of 65 mm which was wound with cloth made of rayon or the like at a revolution speed of 450 rpm in one direction. At this time, the proceeding speed of the stage on which the substrates were mounted was at 20 mm/sec. The rubbing number of times was once. Therefore, the rubbing density is calculated as 154 according to equation 1.

Thereafter, in order to maintain a cell gap 2.5 μm, inorganic silica beads of 2.5 μm in diameter were spread on the substrates as a spacer, and the two substrates were fixed with an epoxide adhesive made of two kinds of liquid. A liquid crystal material 603 was then injected into the space defined between these two substrates.

The liquid crystal material which was injected into the liquid crystal cell is made of a ferroelectric liquid crystal, "CS-1014" manufactured by "Chisso Corporation". The phase series of the liquid crystal is Iso-N* -SmA-SmC* -Cry, and the transition temperature of Iso-N* is at 81° C., N* - SmA is at 69° C., SmA - SmC* is 54° C., and SmC* -Cry is at −21° C. The spontaneous polarization of the liquid crystal is 5 nC/cm². The threshold value of the liquid crystal material was 1V as a result where the electro-optic characteristic was measured while applying a square wave of 1 Hz or less.

The orientation state of the liquid crystal of the liquid crystal cell was observed under the crossed Nicol through a polarization microscope. As a result, the line-like or zigzag-like defects were hardly found in the case of a cell in which the sintering temperature was 200° C. or more as the oriented film forming condition. On the other hand, in the case of a cell in which the sintering temperature was 150° C., the disarray of orientation was conspicuous.

When the stage was rotated under the condition where the pixel electrodes were short circuited, in the above cell with good orientation state, there was obtained an extinction state, that is, a light, which has been incident into one polarizing plate, did not penetrate through the other polarizing plate as if the light was interrupted. This fact means that all of the liquid crystal molecules are oriented in one direction even though an electric field is not applied, and also as shown in FIG. 6, the spontaneous polarization 605 of the liquid crystal material 603 is oriented in the vertical direction with respect to the substrates of the liquid crystal display device.

Figure 7:
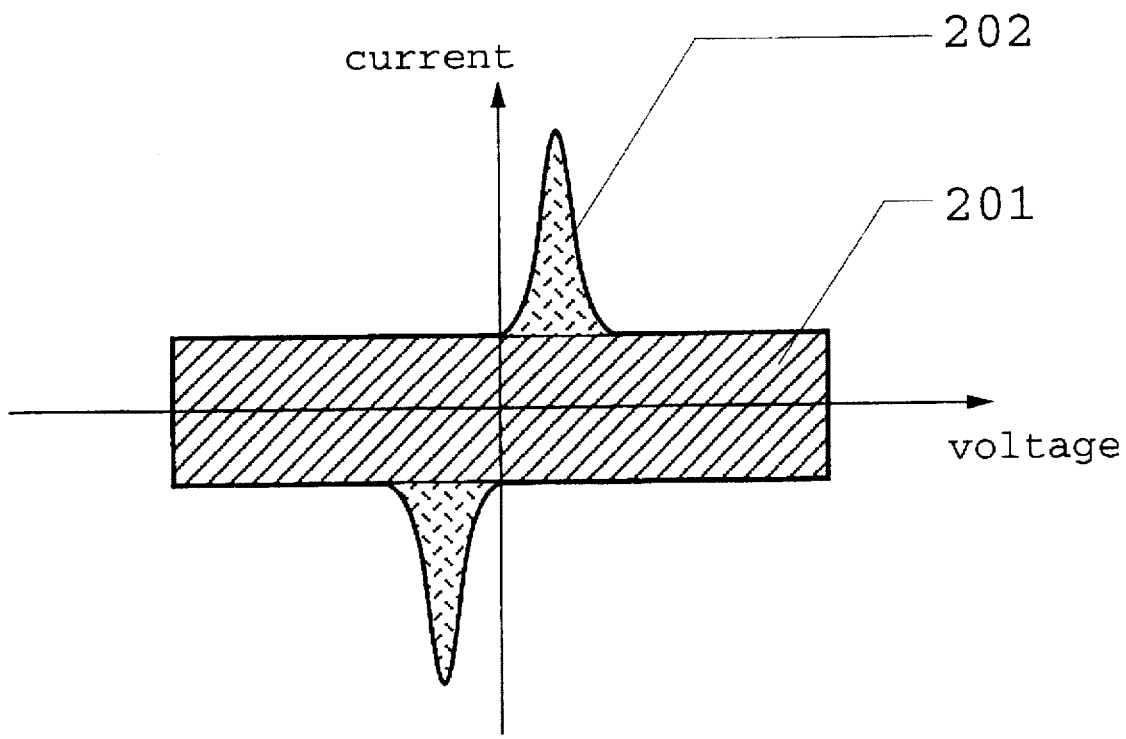
FIG. 7 shows a current-to-input voltage characteristic of the liquid crystal cell in the first embodiment.

FIG. 7 shows the current-to-input voltage characteristic of the liquid crystal cell. Similarly to the above case, measurement was conducted by applying a chopping wave of ±30 V and 5 Hz. In the figure, in the liquid cell with the good orientation condition, the current component was hardly observed except for the capacity component 201 as a capacitor and a current component 202 flowing when the spontaneous polarization of the liquid crystal material was inverted. The values of the second peak current are shown in Table 1. The second peak value results from subtracting the capacity component from the top of the peak.

Figure 8:
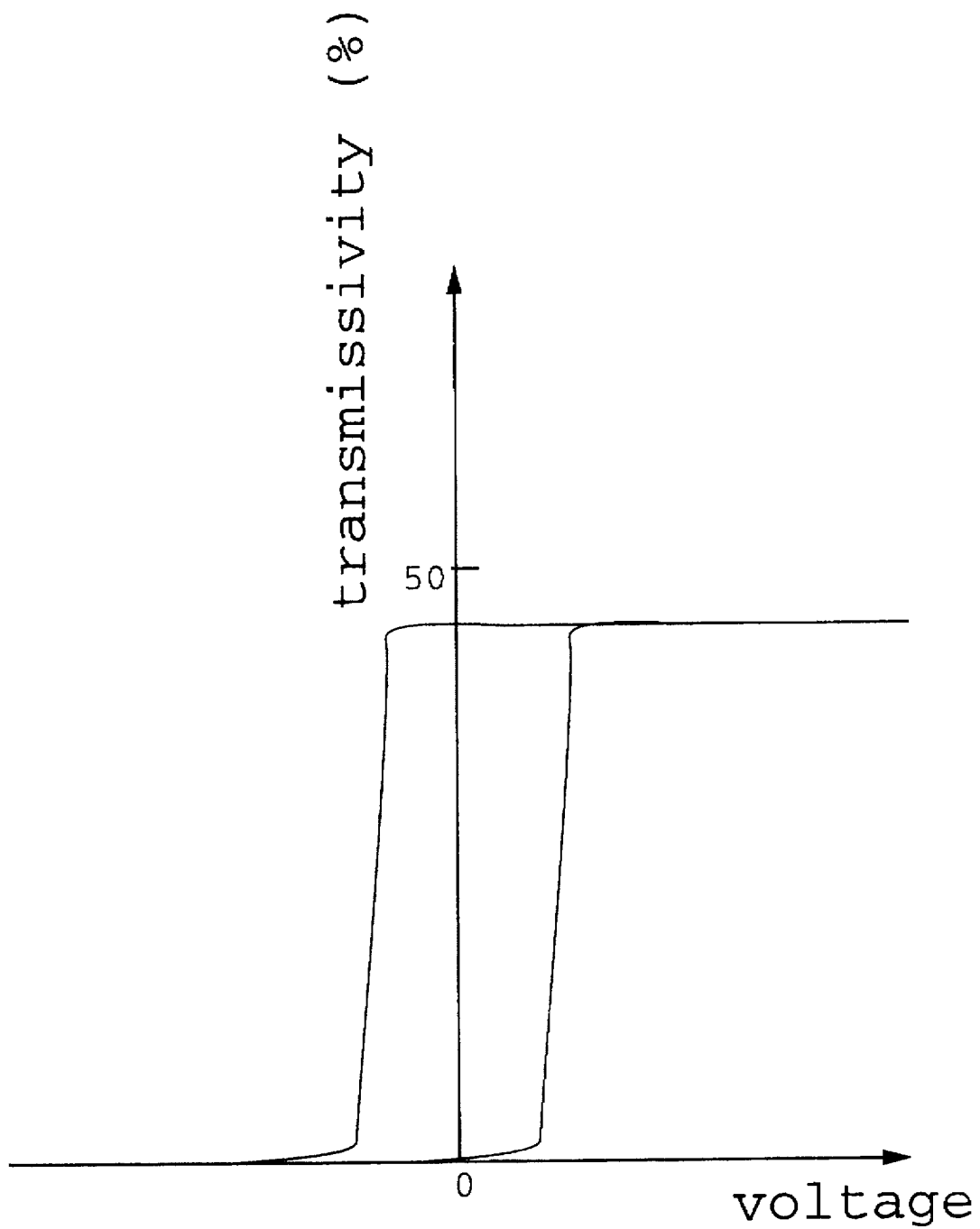
FIG. 8 shows the electro-optic characteristic of the liquid crystal in the first embodiment.

FIG. 8 shows the electro-optic characteristic of the liquid crystal cell. As a measuring method, the liquid crystal cell is driven by applying a square wave of ±30 V and 5 Hz under the crossed Nicol through a polarization microscope with a light source consisting of a halogen lamp, and the intensity of transmission light is detected by a photomultiplier. At this time, the liquid crystal cell is fixed at such a position that an output signal of the photomultiplier becomes a minimum level. In view of the figure, in the cell with the above-mentioned good orientation state, the contrast ratio is 100, and the hysteresis loop, which serves as a memory capacity judging factor, also becomes large. Table 1 shows that the cell with the orientation film forming condition of 16 times and at 200° C., tends to have a slightly high second peak, however, there is particularly no problem as to the optical response. On the other hand, in the case that the sintering temperature was 150° C., the cell has a low second peak, however, because it was insufficient to harden the film, the orientation film was excessively rubbed off by the rubbing operation. As a result, such a cell could not sufficiently provide optically uniaxial orientation, and the optical response was remarkably lowered.

TABLE 1

| SINTERING TEMP | DILUTION DENSITY | |
|---|---|---|
| (°C.) | 16 | 32 |
| 150 | 2.5 | 1.7 |
| 200 | 3.2 | 1.0 |
| 250 | 1.6 | 1.0 |
| 300 | 1.1 | 1.1 |

As described above, the liquid cell with a good characteristic could be obtained under certain film forming conditions. The optical characteristics and the electric characteristics of the liquid crystal cell greatly depend upon the characteristics of the orientation film material and the interaction between the orientation film and the liquid crystal at their interface. In the embodiment, it is obviously predicted that the physical property and the surface condition of the orientation film are varied depending upon the film forming conditions and the surface treatment. Hence, the various characteristics of the orientation film and the surface interaction between the orientation film and the liquid crystal were subsequently measured.

The thicknesses of the oriented film prepared under the above-mentioned conditions are shown in Table 2, and the dielectric constants thereof are shown in Table 3, respectively. The thickness of the film was measured by the microspectrophoto photometer TFM-120 AFT (manufactured by Orc Manufacturing Ltd.), and the dielectric constant was measured by the impedance analyzer 4192A (manufactured by Hewlett Packard Corporation).

TABLE 2

| DILUTION DENSITY | 16 | 32 |
|---|---|---|
| FILM THICKNESS (Å) | 200 | 120 |

TABLE 3

| SINTERING TEMP. (°C.) | 150 | 200 | 250 | 300 |
|---|---|---|---|---|
| DIELECTRIC CONSTANT | 3.7 | 4.6 | 7.6 | 3.8 |

Subsequently, in order to confirm the influence of the surface treatment of the above-mentioned orientation film on the orientation of the liquid crystal material, the pretilt angle of the liquid crystal molecules was measured. The measurement results are shown in Table 4.

TABLE 4

| SINTERING TEMP. | DILUTION DENSITY | |
|---|---|---|
| (°C.) | 16 | 32 |
| 150 | 2.1 | 2.1 |
| 200 | 3.1 | 2.5 |
| 250 | 3.1 | 1.6 |
| 300 | 2.7 | 1.6 |

In this embodiment, the pretilt angle was measured by the crystal rotation method which is an optically measuring method. Essentially, for the measurement, the liquid crystal used in this embodiment, the liquid crystal material having ferroelectricity has to be used. However, since this measuring method is difficult to measure the liquid crystal having an optically biaxial as in the ferroelectric liquid crystal material, a nematic liquid crystal of an optically uniaxial was used instead of a ferroelectric liquid crystal for indirect measurement.

Two substrates of the liquid crystal cell used were the same one-pixel substrates as the above-mentioned cell. Formed on the two substrates were the above-mentioned orientation films. The film forming conditions were set to dilutions of 16 times and 32 times, sintering temperatures of 150, 200, 250 and 300° C., and rubbing density of 154, as in the above-mentioned evaluation cell.

In the measurement according to the above-mentioned method, when assembling two substrates, the rubbing directions for the orientation films on the two substrates were set in inverse-parallel (i.e. opposite with each other). The PET film was used for the liquid crystal as a spacer, and a gap of 50 μm was formed. The liquid crystal material used for measurement was the nematic liquid crystal ZLI-4455-100 (manufactured by Merck Japan Ltd.).

The liquid crystal cell was subjected to an aging treatment at 120° C. for 2 hours in order to remove an unevenness of an orientation occuring when the liquid crystal was injected into the cell and to remove an influence of a disagreement in an orientation of the liquid crystal between a bulk portion of the liquid crystal and the interface portion near the orientation film.

In view of Table 4, there is a tendency that, as the pretilt angle is made small, the second peak current becomes smaller. Within the range of 1.6° to 3.1°, the second peak is satisfactorily small. Although the cell which was subjected to sintering at 150° C. had a small pretilt angle, its optical response was lowered.

Subsequently, the contact angle on the substrates was measured, and a surface energy was calculated on the basis of the measured contact angle. The contact angle was measured by the contact angle meter G-T-1000 manufactured by Eruma Corporation. For measurement of the contact angle, two kinds of liquid $H_2O$ and $CH_2I_2$ were used, and on the basis of the contact angle in the case of using the respective liquid, the polar term and the dispersion term of the surface tension were calculated from expression 2. The results were shown in Table 5. Since only the polar term among the surface tension is related to the pretilt angle, only the values of the polar term are shown in the table.

TABLE 5

| SINTERING TEMP. | DILUTION DENSITY | |
|---|---|---|
| (°C.) | 16 | 32 |
| 150 | 18.0 | 18.5 |
| 200 | 11.7 | 14.7 |
| 250 | 11.4 | 12.0 |
| 300 | 11.0 | 13.1 |

$$W_{SL} = \gamma_L(1 + \cos\theta) \quad \text{[Equation 2]}$$

$$\gamma_S = \gamma_S^p + \gamma_S^d$$

$$\gamma_S^p = \left[ \frac{(W_{SLi})\{(\gamma_L^d)^{1/2}\}_j - (W_{SLi})\{(\gamma_L^d)_{1/2}\}_i}{\{(\gamma_L^p)(\gamma_L^d)_j\}^{1/2} - \{(\gamma_L^d)(\gamma_L^p)_j\}^{1/2}} \right]^2$$

$$\gamma_S^d = \left[ \frac{(W_{SLi})\{(\gamma_L^p)^{1/2}\}_j - (W_{SLi})\{(\gamma_L^p)^{1/2}\}_i}{\{(\gamma_L^p)(\gamma_L^d)_j\}^{1/2} - \{(\gamma_L^d)(\gamma_L^p)_j\}^{1/2}} \right]^2$$

The meanings and units of the respective marks are as follows:

$W_{SL}$: adhesion work [dyne/cm]

$\gamma_L$: the surface tension of known liquid [dyne/cm]

$\gamma_L^P$: the polar term of the surface tension of known liquid $\gamma_L^d$: the dispersion term of the surface tension of known liquid $\theta$: contact angle [°]

$\gamma_S$: the surface tension of solid [dyne/cm]

$\gamma_S^P$: the polar term of the surface tension of solid $\gamma_S^d$: the dispersion term of the surface tension of solid $i$: liquid i $j$: liquid j It was found from table 5 and Table 1 that the values of the polar term of the surface tension are within the range of 11 to 15 dyne/cm. The cell with the poor characteristics, which was subjected to sintering at 150° C., had a remarkably large surface tension of 18 dyne/cm or more.

Figure 9:
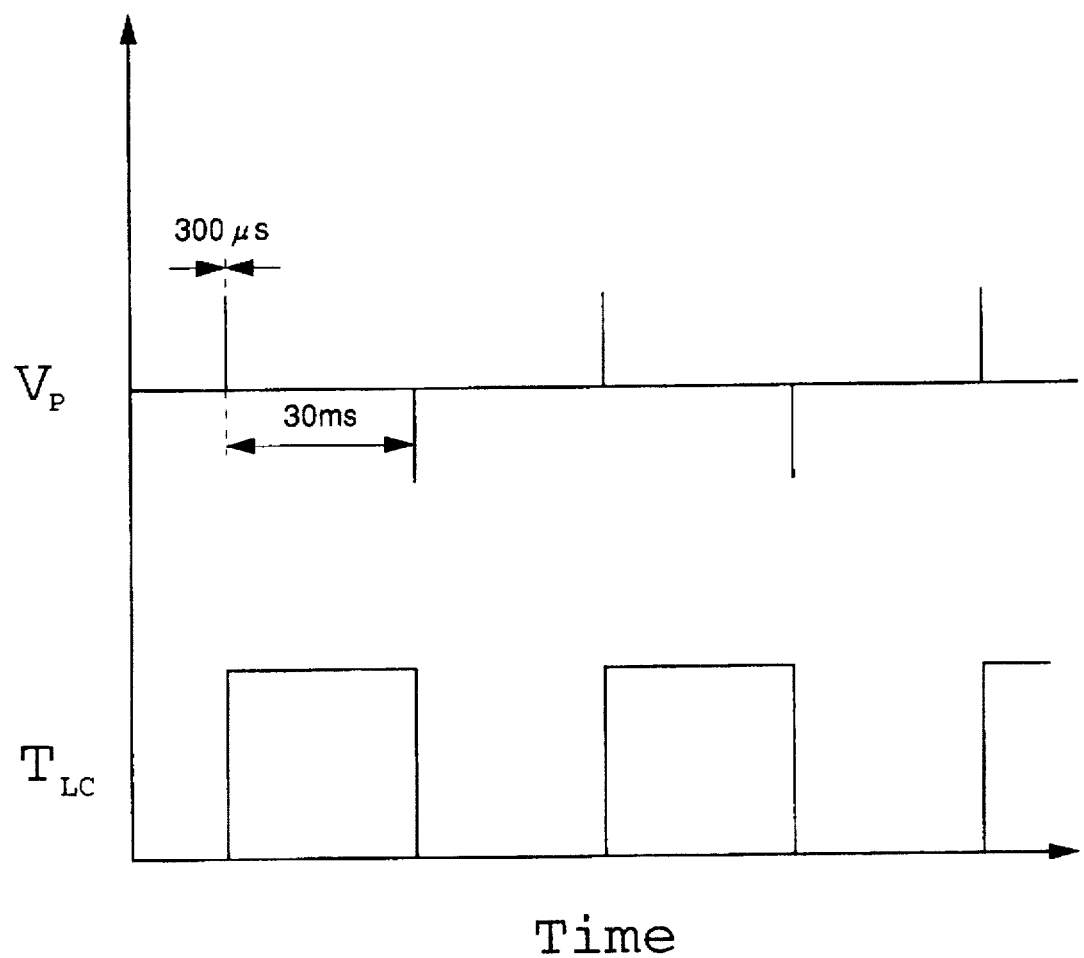
FIG. 9 shows a pulse memory capability of the liquid crystal cell in the first embodiment.

FIG. 9 shows the result of the evaluation of a pulse memory capacity which is important at the time of simple matrix driving with respect to the above-mentioned electro-optical characteristic evaluation cells with good orientation state among the manufactured ones. In this evaluation, positive and negative pulses are alternately applied. The pulse wave is of 20 V, the pulse width of 300 μs, and the pulse interval of 30 ms. During the period when a pulse is not applied, the two electrodes are substantially short-circuited. As shown in the figure, the response of the transmitted light intensity is rapid, and the saturation occurs immediately after the display state of the pixel has been inverted. Even after completion of pulse application, the transmitted light intensity is maintained constant.

Figure 10:
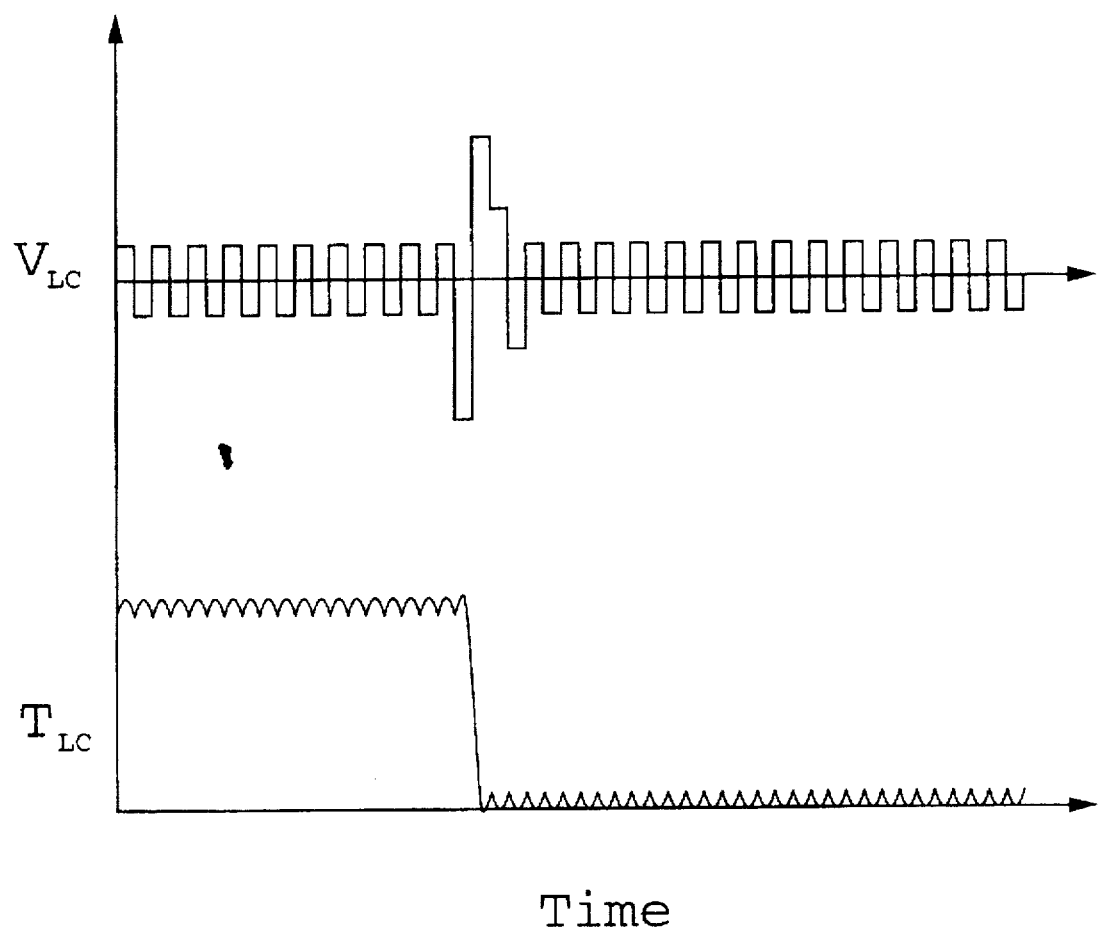
FIG. 10 shows the optical characteristic when driving 4-pulse method waveform of the liquid crystal cell in the first embodiment.

FIG. 10 shows the electro-optic characteristic of the liquid crystal cell when applying a drive waveform. The applied wave form is obtained by standarizing a wave form for a 4-pulse method which is used for driving a matrix panel. It was observed that there was a few deviation and the contrast was as high as about 100.

In this embodiment, according to the foregoing results, a multiplex drive panel was prepared, and soda-lime glass plates were used as substrates of the cell. ITO films were formed on both the substrates as electrodes. The scale of the matrix of the liquid crystal cell was of 1920×480 pixels.

In this embodiment, the conditions of preparing the orientation film of the panel were of the dilution density of 16 times and the sintering temperature of 250° C., and the rubbing condition of the orientation film was of the rubbing density of 154. The orientation films were coated on the two substrates, and rubbing was made for the orientation films on the two substrates. The directions of rubbing on the two substrates were in parallel to each other. The liquid crystal material was made of above-mentioned CS-1014.

In this liquid crystal display device, the display having the maximum contrast ratio 120 at the time of simple matrix drive could be performed.

Even when the liquid crystal material having antiferro-electricity (e.g. CS-4000 manufactured by Chisso) was used in the cell having the same structure as that of this embodiment, the same result was obtained.

(Second Embodiment)

In the second embodiment, in order to recognize the effects of the invention, the physical property of the liquid crystal cell of one pixel was evaluated as a prestage of preparation of the liquid crystal display device.

A purpose of this embodiment is that drive switching elements are provided on the substrate of the liquid crystal display device, and active matrix drive is performed through the drive switching elements to prepare a device which is capable of performing digital gradation display. For this purpose, in this embodiment, as the evaluation of the liquid crystal cell, a signal generating unit having the same characteristics as those obtained when driving the liquid crystal material actually by disposing the switching element within the liquid crystal display device is connected to the exterior of the liquid crystal cell so that the liquid crystal material is driven by the signal generating unit. Thus, the optical response of the liquid crystal cell was evaluated.

The evaluation liquid crystal cell used in this embodiment is equal to that in the first embodiment. The film forming conditions of the orientation film is of the dilution density of 16 times, the sintering temperature of 250° C. and the rubbing density of 154.

Figure 11:
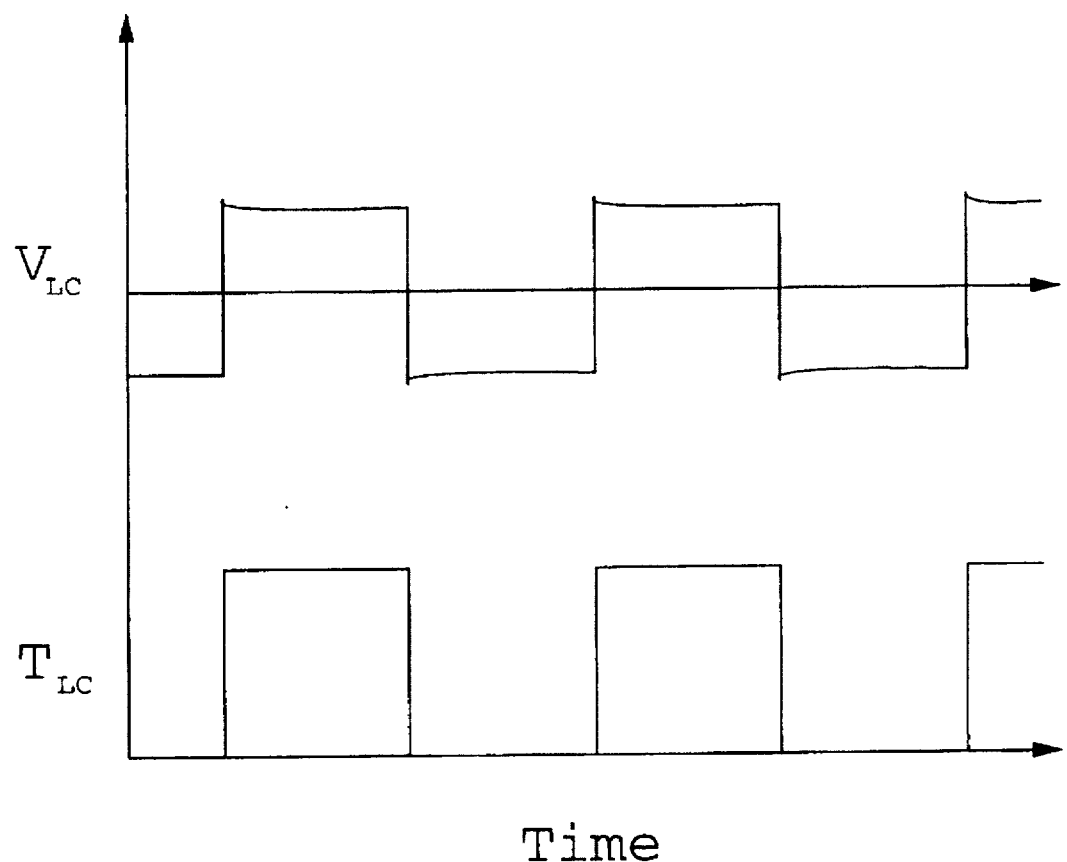
FIG. 11 shows the optical characteristic at the time of applying a pulse of a liquid crystal cell in a second embodiment.

FIG. 11 shows waveforms of a pixel voltage ($V_{LC}$) and the pixel transmitted light intensity ($T_{LC}$). The drive waveform of this evaluation is of data signal voltage of ±14 V, gate pulse voltage of −15 V, a gate pulse width of 1 μs and one frame of 1 s. The applied voltage has a value exceeding a threshold value of the liquid crystal material and is held till frame completion. The optical response is also rapid with respect to application of the gate pulse, and held to a given transmitted light intensity till the frame completion.

On the basis of this result, a panel of active matrix drive was prepared.

Figure 12:
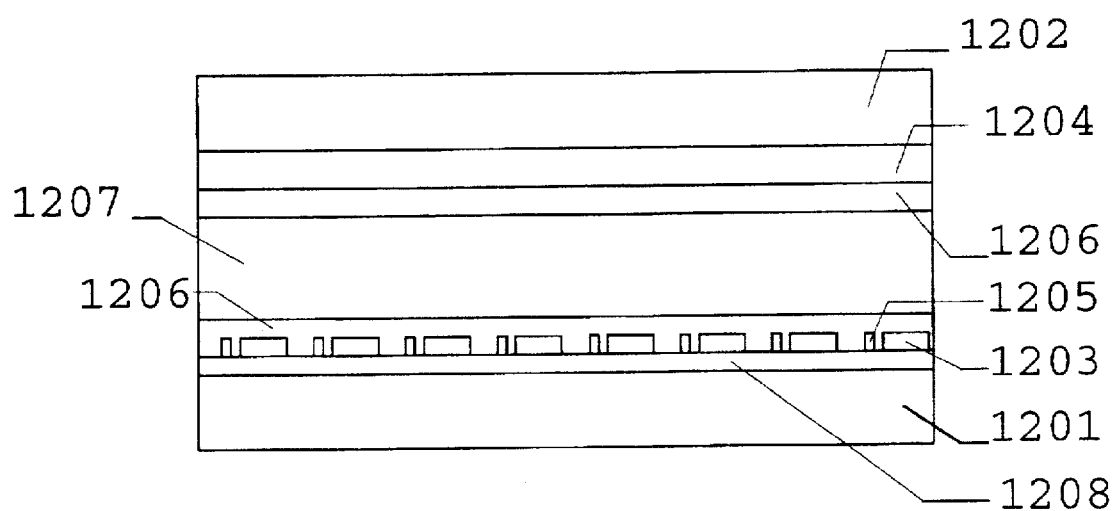
FIG. 12 is a schematic diagram showing a liquid crystal display device in the second embodiment.

FIG. 12 shows the structure of the liquid crystal display device prepared by this embodiment. One substrate 1201 of the cell is made of a non-alkaline glass. An active matrix is formed with pixel electrodes 1203 and crystalline silicon TFTs 1205 on the substrate. An insulation film 1208 such as silicon oxide was also formed on the substrate. On the entire surface of the counter substrate 1202, an ITO film 1204 was formed as a counter electrode. An orientation film 1206 was formed on the substrate having the electrodes and the like. The material used for the orientation film was RN-305 used in the above-described embodiment. The film forming conditions of the orientation film were of dilution of 16 times, and the sintering temperature of 250° C. The surface of the orientation film was rubbed at the strength of the rubbing density 154. The two substrates were arranged so that the rubbing directions on the upper and lower orientation film were in parallel to each other. A liquid crystal material 120 7 was interposed between the two substrates.

In this embodiment, a PMOS TFT having a single gate was used because it has a small leakage current and a large ON/OFF ratio. Typically, the leakage current was 1 pA or less (gate voltage of +15 V, drain voltage of −10 V or less), and the ON/OFF ratio was 7.5 figures or more (gate voltage of −15 V/+15 V, drain voltage of −10 V).

The size of a pixel was of 20 μm×60 μm, the scale of matrix was 1920×480. As a result of investigating the electric charge holding capability of each pixel, the worst voltage was −9V after 3 msec passed since a data singla of −1 0V was applied. Consequently, in this embodiment, the width of the scanning signal pulse applied to matrix was set to 1 μsec and the height of pulse wave was set to −15 V and the data signal was set to ±15 V.

In this liquid crystal display device, display having the maximum contrast ratio 120 could be obtained.

Even when the liquid crystal material having antiferroelectricity was used in the cell having the same structure as that in this embodiment, the same result was obtained.

As was described above, according to the present invention, the orientation of the liquid crystal material was improved, and the low second peak state was realized, as the result of which the liquid crystal display device with an extremely good optical response could be obtained.

When the simple matrix drive and active matrix drive due to TFT are conducted in accordance with the liquid crystal display device of the present invention, display with a high-speed response and a high contrast ratio can be performed.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A liquid crystal device comprising:

a pair of substrates;

an electrode arrangement formed on said substrates;

a liquid crystal layer comprising a material selected from the group consisting of a ferroelectric liquid crystal and an anti-ferroelectric liquid crystal; and at least one orientation control layer formed in contact with said liquid crystal layer, wherein a value of a polar term of surface tension on a surface of said orientation film ranges from 11 dyne/cm to 15 dyne/cm and molecules of said liquid crystal layer have a pretilt angle within a range of 1.6° to 3.1°.

2. The liquid crystal device of claim 1 wherein said orientation control layer comprises a material selected from the group consisting of polyvinyl alcohol, nylon, polyimide and silicon oxide.

3. The liquid crystal device of claim 1 wherein at least one of said substrates is transparent.

4. A liquid crystal device comprising:

a pair of substrates;

an electrode arrangement formed on said substrates for defining a plurality of pixels in the form of a matrix;

a plurality of thin film transistors formed on one of said substrates for said pixels;

a liquid crystal layer comprising a material selected from the group consisting of a ferroelectric liquid crystal and an anti-ferroelectric liquid crystal; and at least one orientation control layer formed in contact with said liquid crystal layer, wherein a value of a polar term of surface tension on a surface of said orientation film ranges from 11 dyne/cm to 15 dyne/cm and molecules of said liquid crystal layer have a pretilt angle within a range of 1.6° to 3.1°.

5. The liquid crystal device of claim 4 wherein said orientation control layer comprises a material selected from the group consisting of polyvinyl alcohol, nylon, polyimide and silicon oxide.

6. The liquid crystal device of claim 4 wherein at least one of said substrates is transparent.

7. A liquid crystal device comprising:

a pair of substrates;

an electrode arrangement formed on said substrates;

a liquid crystal layer comprising a material selected from the group consisting of a ferroelectric liquid crystal and an anti-ferroelectric liquid crystal; and at least one orientation control layer formed in contact with said liquid crystal layer, wherein said orientation control layer is capable of causing a nematic liquid crystal to have a pretilt angle of not higher than 3.1° by contacting thereto.

8. The device of claim 7 wherein said orientation control layer is capable of causing a nematic liquid crystal to have a pretilt angle of not lower than 1.6° by contacting thereto.

9. The liquid crystal device of claim 7 wherein said orientation control layer comprises a material selected from the group consisting of polyvinyl alcohol, nylon, polyimide and silicon oxide.

10. The liquid crystal device of claim 7 wherein at least one of said substrates is transparent.

11. A liquid crystal device comprising:

a pair of substrates:

an electrode arrangement formed on said substrates for defining a plurality of pixels in the form of a matrix;

a plurality of thin film transistors formed on one of said substrates for said pixels;

a liquid crystal layer comprising a material selected from the group consisting of a ferroelectric liquid crystal and an anti-ferroelectric liquid crystal; and at least one orientation control layer formed in contact with said liquid crystal layer, wherein said orientation control layer is capable of causing a nematic liquid crystal to have a pretilt angle of not higher than 3.1° by contacting thereto.

12. The device of claim 11 wherein said orientation control layer is capable of causing a nematic liquid crystal to have a pretilt angle of not lower than 1.6° by contacting thereto.

13. The liquid crystal device of claim 11 wherein said orientation control layer comprises a material selected from the group consisting of polyvinyl alcohol, nylon, polyimide and silicon oxide.

14. The liquid crystal device of claim 11 wherein at least one of said substrates is transparent.

* * * * *